March 23, 1971 — H. R. BITTNER ET AL — 3,572,319

INTRAOCULAR PRESSURE CONTROL SYSTEM

Filed May 23, 1969 — 2 Sheets-Sheet 1

Inventor
HAROLD R. BITTNER
RAY E. DIGMAN
By Browdy and Neimark
Attorney

United States Patent Office 3,572,319
Patented Mar. 23, 1971

3,572,319
INTRAOCULAR PRESSURE CONTROL SYSTEM
Harold R. Bittner and Ray E. Digman, Silver Spring, Md., assignors to the United States of America as represented by the Secretary of Health, Education, and Welfare
Filed May 23, 1969, Ser. No. 827,307
Int. Cl. A61b 3/16
U.S. Cl. 128—2                                      10 Claims

ABSTRACT OF THE DISCLOSURE

A system for controlling fluid flow into or out of the eye while observing the effect on intraocular pressure. A needle is inserted into the eye, and an accurately calibrated pressure feed system injects or withdraws the fluid, while instantaneous readout capabilities give volumetric displacement of fluid, and pressure within the eye.

SPECIFICATION

The present invention relates to pressure measuring systems and, more particularly, to pressure measuring systems which are capable of providing accurate and sensitive readings of intraocular pressure versus volume of fluid, and flow of fluid versus pressure, as performed on ocular specimens.

In the diagnosis and treatment of many diseases of the eye, and particularly in situations where surgery is involved, there is an urgent need to have an accurate and continuous knowledge of the relationship between intraocular pressure and the amount of fluid within the eye itself. In cases involving the malady of glaucoma, for example, internal pressure builds up within the confines of the eyeball itself until it is not only extremely painful to the patient, but often results in loss of vision. In treating a disease of this sort it is necessary to relieve the internal pressure within the eyeball, and heretofore there either has been no means of monitoring this pressure, or if devices were available they did not provide sufficiently accurate results and were undependable.

The present invention offers a vast improvement over these prior art devices in that it provides an accurate, dependable, fast, continuous reading system for indicating intraocular pressure. Also forming a component of the system there is a highly sensitive and carefully calibrated device for inserting or withdrawing fluid from the eye while at the same time giving instantaneous readings of pressure versus volume of fluid, and flow of fluid versus pressure.

It is, accordingly, an object of the invention to provide a system for measuring intraocular pressure.

Another object of the present invention is the provision of continuous readings of intraocular pressure versus volume of fluid within the eye.

Another object is the provision of continuous readings of rate of fluid flow versus pressure within the eye.

Yet another object is the controlling of fluid flow into or out of the eye while observing the effect on intraocular pressure.

Another object of the present invention is to obviate the deficiencies of the prior art such as indicated above; and to provide a suitable system, means and method for obtaining such objects.

Other objects and many of the attendant advantages of the instant invention will be readily appreciated as the same becomes better understood by reference to the following detailed description of an embodiment of the invention when considered in connection with the accompanying drawings in which like reference numerals designate like parts throughout the figures thereof and wherein.

Referring now to various figures of the drawings it will be observed that the intraocular pressure control system of the present invention consists of three basic subsystems; namely, (1) the system of sensing devices; (2) the system of controlling devices; and (3) the readout circuitry. These will be described separately and then as they function in the entire system.

(I) SENSING DEVICES

(A) Differential pressure sensor

Figure 1:
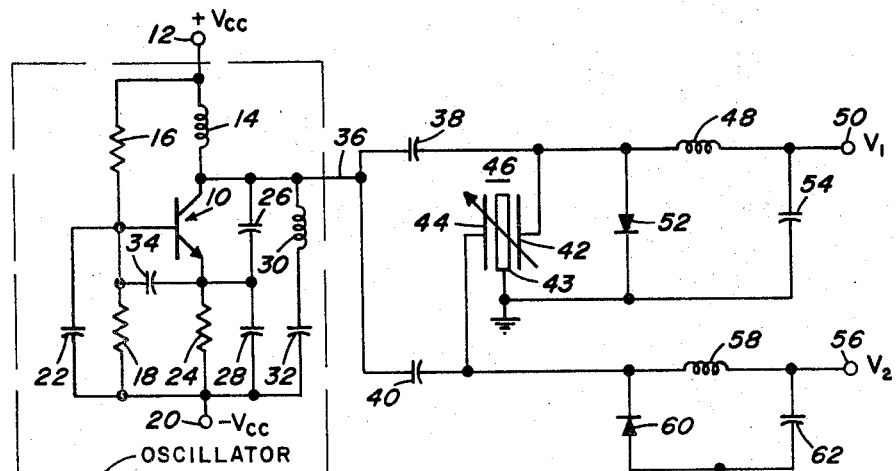
FIG. 1 shows a schematic circuit for the differential pressure sensor.

The preferred differential pressure sensor, shown as a circuit diagram in FIG. 1, takes the form of a bridge circuit having a transistorized sine wave oscillator and two half wave rectifiers and associated filters. An NPN transistor 10 has positive potential applied to it from a voltage terminal 12 by means of a coil 14 connected to the collector. Positive potential is likewise applied from terminal 12 through a dropping resistor 16 to the base of transistor 10, another dropping resistor 18 being connected between the transistor base and a negative potential terminal 20. A capacitance 22 connects the transistor base with the negative terminal 20 while a resistance 24 connects the emitter terminal of the transistor with the terminal 20. A parallel tuned circuit connects the emitter terminal with the negative terminal 20, the tuned circuit consisting of capacitances 26 and 28 in series being connected in parallel with series connected coil 30 and capacitance 32. The final component making up the oscillator is a capacitance 34 which is tied between the base and emitter terminals of the transistor. It should be noted that the junction between capacitances 26 and 28 is also tied to the emitter terminal of the transistor 10.

The output of the oscillator, as produced on lead 36 from the collector terminal divides between two capacitances 38 and 40, the other connection of these capacitances being joined to a pair of fixed plates 42 and 44, respectively, of a variable capacitance 46. A filter choke 48 is tied between capacitance plate 42 and a voltage terminal 50 while the remainder of the filter circuit consists of a diode 52 and a fixed capacitance 54. The other, comparable side of the bridge, which is connected between the fixed plate 44 and a terminal 56 is made up of a filter choke 58, a diode 60 and a capacitance 62.

In operation, the differential pressure sensor provides a measurement of the difference between intraocular pressure P and a known external reference pressure $P_0$. This unit operates on the basic principle of detecting a difference signal by means of measuring the unbalance in a reactance type bridge circuit. For this unit, variable capacitance 46 is the preferred unbalancing element of the bridge circuit, FIG. 1, the intraocular pressure being arranged to move the variable plate 43 of the capacitance 46 and thereby unbalance the bridge.

The bridge circuit is excited by the 2 megahertz transistorized 10 sine wave oscillator and the unbalance of the bridge is sensed by means of two half wave rectifiers 52 and 60 and the associated filters 48, 54 and 58, 62 respectively. The D.C. voltages associated with each rectifier-filter unit are summarized algebraically to form a difference voltage indicative of the differential pressure. The use of this voltage is discussed below.

Figure 2:
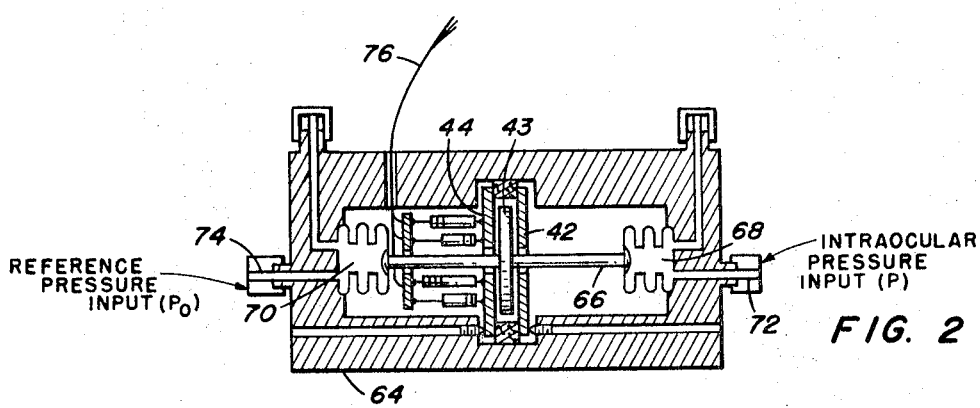
FIG. 2 shows the structural embodiment of the differential pressure sensor.

As shown in FIG. 2, the capacitance pick-off unit is made up of the movable ground plane capacitor plate 43 and the two opposing fixed capacitor plates 42 and 44, located within a housing 64. The ground plane 43 is part of a central shaft 66 which is suspended at each end of the unit by suitable bellows 68 and 70, preferably formed of bronze. These bellows are vented directly to the pressure heads P at connection 72 and $P_0$ at connection 74, whereby their difference $(P-P_0)$ results in a capacitance change due to a change in the spacing between fixed plates 42, 44 and movable plate 43. An electrical cable 76 carries potential to the transistor 10 and its associated components, as well as the potential indicative of the bridge unbalance.

(B) Motor speed sensor

Figure 4:
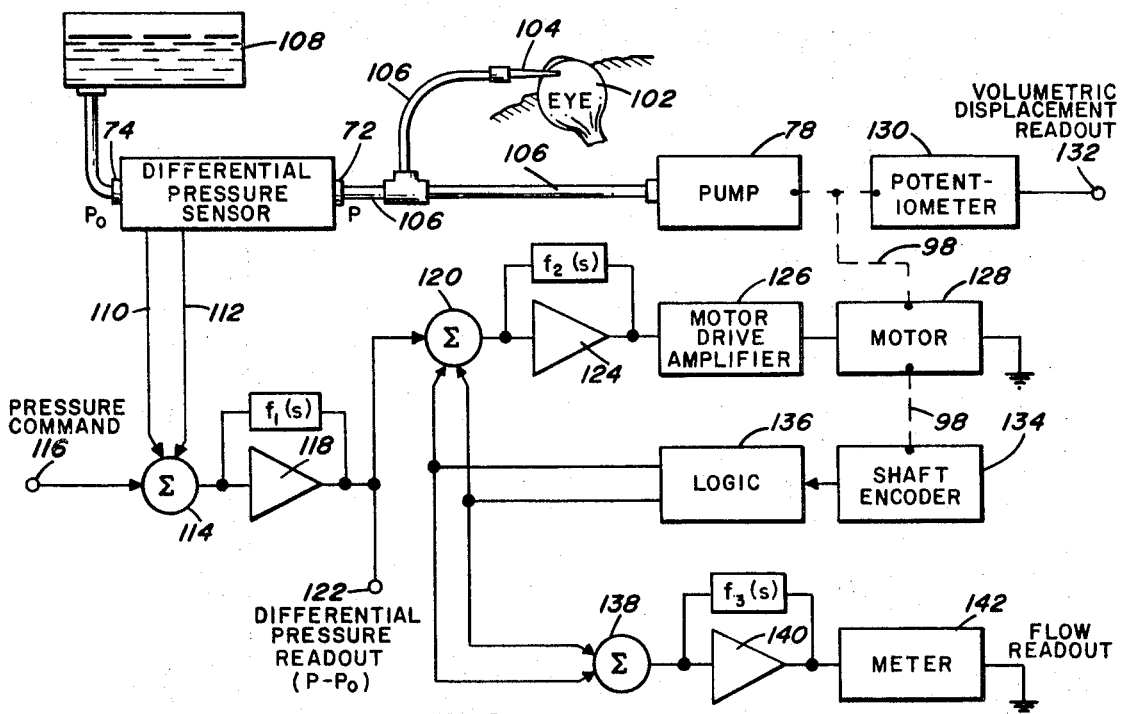
FIG. 4 shows the differential pressure readout circuit.

The motor speed sensor, shown schematically in FIG. 4, operates primarily as a feedback element, necessary to achieve the required range of flow.

Motor speed indication is achieved by coupling a shaft encoder directly to a fluid displacement pump drive motor. This encoder preferably produces eight pulses-per-revolution of the motor shaft, which indicates motor speed in terms of pulse frequency. The pulses produced are generated by rotating two cylindrical capacitor plates past two fixed cylindrical capacitor plates and detecting the rise and fall in voltage that results from the variation in reactance of the elements. A simple logic network between the shaft encoder and the input to the control system determines the motor rotation direction. The eight pulses per motor shaft revolution are derived from two outputs of the motor speed sensor system—one output representing clockwise rotation and the other counterclockwise. These two separately phased pulse trains are also filtered to provide the approximate instantaneous readout of fluid flow.

(II) CONTROLLING DEVICE AND CIRCUITRY

(A) Fluid displacement drive motor

The drive motor may be for example a 12-volt D.C., or like size, motor which is excited by a push-pull type D.C. power amplifier. This motor serves the following three functions within the system:

(1) Mechanical displacement of the pump bellows through a gear reduction of e.g. 25,000:1 between the motor shaft and the bellows.

(2) Direct drive of the shaft encoder, discussed above in part I (Sensing Devices).

(3) Mechanical drive of a dual-gauged readout potentiometer, coupled through a gear reduction of e.g. 2600:1 between motor shaft and potentiometer shaft.

(B) Fluid displacement pump

Figure 3:
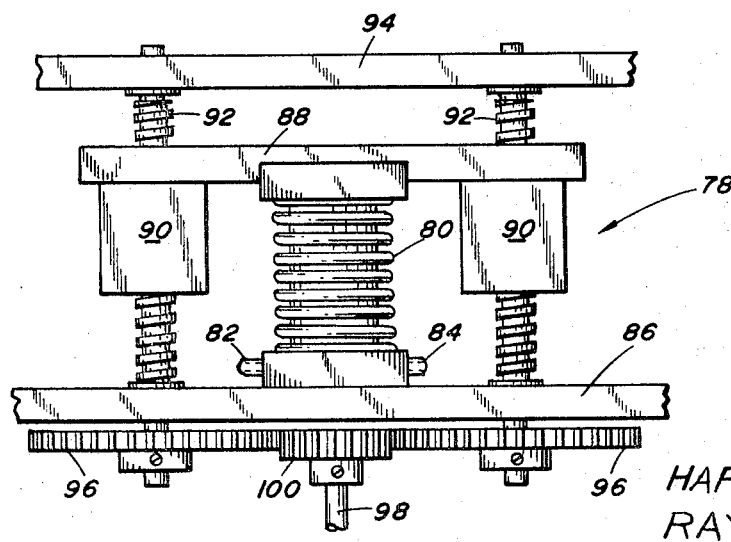
FIG. 3 shows a view of the fluid displacement pump.

As shown in FIG. 3, the displacement pump 78 consists of a flexible bellows 80 which is used as a variable-capacity storage tank for the fluid, the bellows having a control port 84 and a deaeration port 82. A fixed mounting plate 86 is used to support the pump and one end of the bellows 80 is firmly fastened to such plate. The opposite end of the bellows is rigidly connected to a U-shaped bracket 88 at the center of its cross arm, the parallel legs of the bracket consisting of like ball jack nuts 90. Threadedly engaging the ball jack nuts 90 are two ball jack screws 92 which are rottaably mounted at one end by a brace 94, and which have their other ends terminating in ball jack gears 96 below the mounting plate 86 through which the screws rotatively pass. Motor shaft 98 has a drive gear 100 attached to it, gear 100 meshing with intermediate gears and driving gears 96. It may be noted here that, as pointed out above, the reduction ratio of gears 96 to gear 100 is preferably on the order of 25,000:1.

As can be visualized from FIG. 3, any excitation of the drive motor is transferred to the ball jack drive gears which in turn rotate the ball jack screws. This rotary motion is converted (within the ball jack nuts) to a motion along the axis of the bellows which causes expansion or contraction of the fluid filled bellows to form the pumping action.

Noting FIG. 4, which depicts the controlling devices and their relation to the remainder of the system, there is shown a human eye 102 which is under observation, the eye having a needle 104 inserted into its fluid area, the needle being connected by suitable tubing 106 to the system of the present invention. Tubing 106 connects to the differential pressure sensor (FIGS. 1 and 2) at the intra-ocular pressure input P connection 72, while a reference reservoir of reserve fluid 108 connects to the other input of the sensor at junction 74. Pump 78 (FIG. 3) also connects with the pressure sensor via the tubing 106, as can be seen in the drawing.

The differential pressure sensor has two electrical outputs, as has been described supra, these output appearing on lead 110 and 112 before being applied to a summing device 114, a third input to device 114 being a pressure command signal as appearing on input terminal 116. The output of the summing device 114 then passes through a mixing amplifier 118 before being used as an input to a second summing device 120. An output terminal 122, tied to the output of the mixing amplifier 118 provides a readout of the differential pressure, or $P-P_0$.

The output of second summing device 120 is applied to an integrator 124 before being connected to a motor drive amplifier 126, this motor drive amplifier supplying the control potential for a motor 128. The output shaft 98 of motor 128 functions to drive fluid pump 78 as described above and also a potentiometer 130, output terminal 132 from the potentiometer 130 supplying a readout which is indicative of the volumetric displacement of fluid furnished by pump 78. Output shaft 98 from motor 128 also drives a shaft encoder 134 the output of which is applied to a logic circuit 136, the logic circuit 136 in turn providing signals which are impressed in parallel on the second summing device 120 and on a third summing device 138. The two inputs to the third summing device 138 are combined to form a single output which is applied to a filter circuit 140 before being displayed on a meter 142. It should be noted that meter 142 provides an instantaneous and continuously integrated reading of flow readout.

(C) Shaft encoder

The shaft encoder 134 (FIG. 4) serves two functions. Primarily the device is used as a servo feedback control element which controls the lowest fluid flow rates. As the motor shaft 98 rotates, pulses are produced by the shaft encoder 134 and interface logic circuit 136. These pulses are fed back to the input of a control voltage integrator 124 where they subtract from the integral of the input command. Thus, by integrating minute input signals to an output level above the breakaway voltage of the motor, flow can be initiated. In response to this flow, the feedback pulses have a limiting effect by reducing the voltage available to the motor drive amplifier 126. This technique expands the range of flow control by a factor of three.

Secondly, the pulses generated are representative of the flow in both magnitude and direction, and when summed over time they represent volume of fluid displacement. The two previously mentioned outputs of the motor speed sensor system differentiate between flow into and flow out of the eye.

(III) READOUT CIRCUITRY

(A) Volumetric displacement readout (1) As indicated in the above description of the controlling devices and circuitry, each pulse generated by the shaft encoder 134 represents an increment of fluid displacement to or from the eye. In the preferred embodiment each pulse represents $3.14 \times 10^{-3}$ microliters of fluid, therefore a total output of 318 pulses would be indicative of one microliter of displacement. These two channels of pulses are available at the system front panel for recording or further processing.

(2) A continuous history of the displaced fluid is provided by the dual-gauged potentiometer 130 which is driven by the control motor 128. The resistive elements of the two potentiometers are offset by 180° so that one potentiometer is rotating through its linear range during the angular position when the other potentiometer is recycling. Circuitry was developed which selects the two linear portions of the potentiometers and combines these 180° portions to provide two voltage ramps for every 360° of potentiometer shaft rotation. Thus, in the preferred embodiment each 20-volt ramp represents 30 microliters of fluid displacement, hence the readout sensitivity is 1.5 microliters per volt.

(B) Differential pressure readout

Figure 5:
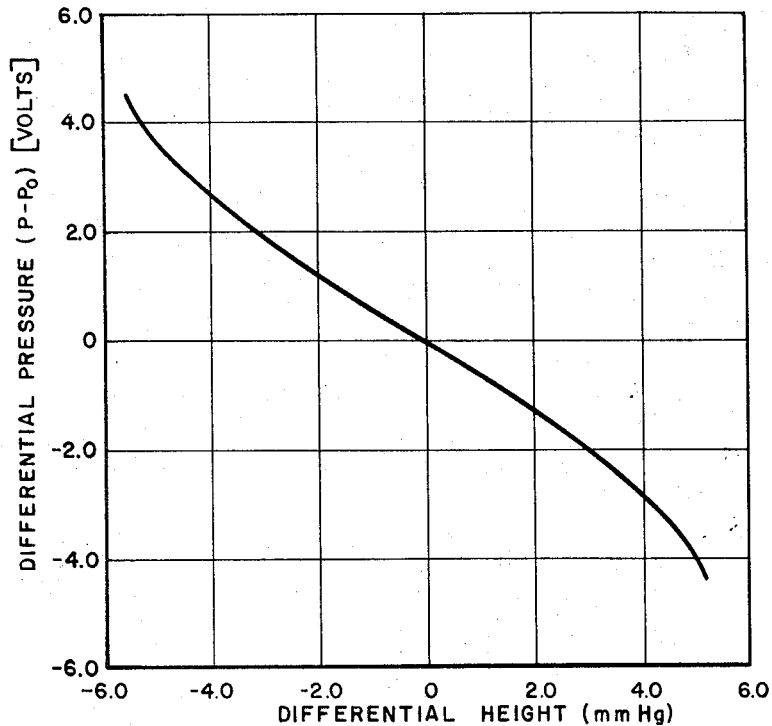
FIG. 5 is a graph of difference in pressure in volts plotted against changes in pressure.

As shown in FIG. 4 the differential pressure $P-P_0$ can be recorded from the output of the mixing amplifier 118, as at output terminal 122. Fig. 5 shows the relation $P-P_0$ (in volts) plotted against changes in P over the usable range of the pressure sensing element. Taken from this data is a sensitivity value $K_1$ equal to 0.645 volt/mm. Hg which was used as an original design figure around which the control loop was developed. By increasing the voltage gain of the mixing amplifier 118, use was made of the more linear portion of the pressure sensor range in FIG. 5.

(C) Flow readout

Approximate fluid flow readout is made available by filtering the pulses from the shaft encoder 134 by means of the filter 140 and displaying this voltage as a front panel meter reading by meter 142. Hence a quantitative indication of fluid rates can be observed at any phase of an operation.

(IV) FLUID DISPLACEMENT CLOSED LOOP

The fluid displacement control loop consists of the pressure sensing device, a mixing operational amplifier 118, an integrator 124 (operational amplifier), a power drive amplifier 126 and the displacement elements (motor 128, gears, and pump 78).

The system is first statically balanced with P adjusted to $P_0$. Under this condition the system is in a null state and will only react to small perturbations around the intraocular pressure P and small fluctuations due to the minimum velocity control deadspace associated with the integrating circuit.

A change is then made in $P_0$ to a value $P_0+\Delta P$. This change in pressure, $\Delta P$, will result in a differential voltage at the output of the mixing amplifier 118. It follows that the integral of this voltage will in turn actuate the motor 128 and drive the pump mechanism 78. The action of the pump is such as to increase the volume of fluid on the specimen side of the system, thus increasing the intraocular pressure to a value $P+\Delta P$. After this condition is satisfied, the action of the system will be to replace the specimen fluid commensurate with the increased intraocular leakage rate which is caused by the increased intraocular pressure.

The above explanation does not account for the action of the feedback pulses and their influence in extending the range of fluid rates. However, this extension can be described by next considering the function and development of the motor speed control loop.

(V) MOTOR SPEED CONTROL LOOP

Due to the non-linear behavior of the motor speed control loop, its closure construction was based on the dynamic structure of the integrator network. This network was developed to achieve very slow fluid rates by integrating the smaller differential signals, with the effect of elminating the inherent motor deadspace voltage. In response to the excitation of the motor, the feedback pulses appear as inputs to the integrator 124 via the mixer 120. These pulses are filtered by a time constant properly chosen to maintain very slow fluid rates. The effect of filtering these pulses is such as to limit the integral of the smaller differential voltages and maintain an average motor excitation voltage just outside of the motor deadspace voltage.

Additional shaping circuitry was developed around the basic integrator which extends the upper half-power frequency from 0.68 cycle per second (characteristic of the motor time constant) out to a corner frequency of 2.5 cycles per second.

From the above description of the structure and operation of the invention, it is obvious that the present device offers an intraocular pressure control device which is not only extremely accurate in its performance, but one which gives continuous and instantaneous readings of fluid pressure within the eye and the volume and rate of flow of fluid into and out of the eye.

After testing and calibrating the above described embodiment the following data is offered, in the nature of an exemplary summary, to further characterize the system.

(A) Volumetric displacement resolution:
(1) 318±5 pulses per microliter over the 500 microliter capacity of the pump bellows.
(2) A continuous displacement readout of 0.667±0.01 volt per microliter.

(B) Differential pressure resolution:
A voltage readout of 0.645±0.01 volt per millimeter of mercury.

(C) Fluid flow resolution:
An instantaneous approximation of flow in microliters per minute provided as a meter readout.

Obviously many modifications and variations of the present invention are possible in light of the above teachings in view of current knowledge. It is therefore to be understood, that modifications, variations and other embodiments within the scope of the invention, may be practiced otherwise than as specifically described.

What is claimed is:

1. An intraocular pressure control system comprising probe means adapted for insertion into an eye whose internal pressure is being controlled;
a fluid reservoir means for establishing a reference pressure;
a differential pressure sensor connected to the probe means and to the reservoir for comparing the pressure in the eye with the reference pressure;
a fluid displacement means, responsive to the output of the pressure sensor, to add or withdraw fluid from said probe means when inserted into the eye so as to balance out the output from the sensor; and
readout means connected to the displacement means.

2. The pressure control system of claim 1 wherein the probe means is a hollow needle.

3. The pressure control system of claim 2 wherein the differential pressure sensor is a reactance bridge which becomes unbalanced when the pressure in said probe means differs from the reference pressure.

4. The pressure control system of claim 3 wherein said reactance bridge is a variable capacitance bridge.

5. The pressure control system of claim 4 wherein the fluid displacement means comprises a pump, a motor operably connected to drive the pump, motor control means, and a feedback circuit in the motor control means.

6. The pressure control system of claim 5 wherein the pump comprises a bellows containing fluid adapted for insertion through said probe means into the eye, a ball jack means for compressing and expanding the bellows, and means for connecting the ball jack means to the motor.

7. The pressure control system of claim 5 further comprising a potentiometer driven by the pump, the potentiometer producing a voltage indicative of the volumetric displacement of fluid to the eye.

8. The pressure control system of claim 7 wherein the feedback circuit for the motor includes a shaft encoder driven by the motor, and an interface logic circuit connected to the shaft encoder.

9. The pressure control system of claim 8 further comprising a meter connected to the logic circuit, said meter producing an instantaneous flow readout for the fluid.

10. The pressure control system of claim 9 further comprising an output terminal connected to the differential pressure sensor, said terminal producing a reading of differential pressure between that in the probe means when inserted into the eye and the reference pressure.

References Cited

UNITED STATES PATENTS

| | | | |
|---|---|---|---|
| 3,143,111 | 8/1964 | Green | 128—2.05X |
| 3,247,712 | 4/1966 | Johnson et al. | 73—152 |
| 3,296,868 | 1/1967 | Koppel et al. | 73—407 |
| 3,319,623 | 5/1967 | London | 128—2.05 |
| 3,461,726 | 8/1969 | Ziegler | 73—398 |

RICHARD A. GAUDET, Primary Examiner

K. L. HOWELL, Assistant Examiner

U.S. Cl. X.R.

73—398, 407; 128—213